M. CASE.
Hand-Seeder.
No. 39,548. Patented Aug. 18, 1863.
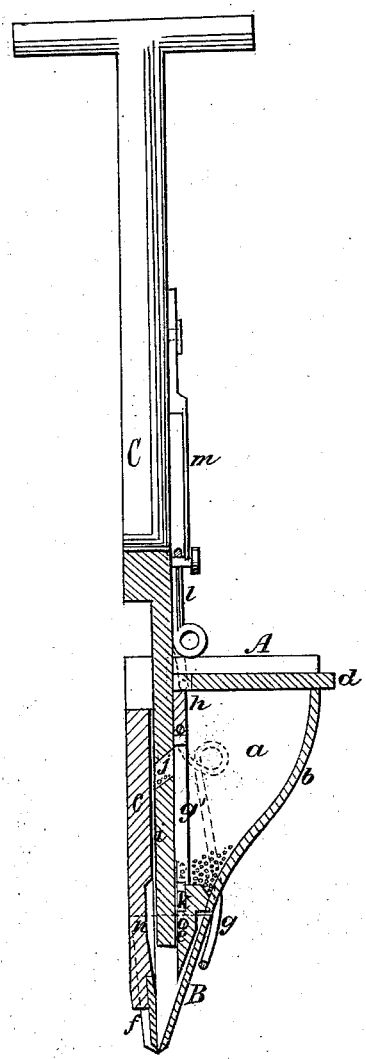
Witnesses:
Inventor:
Myron Case

UNITED STATES PATENT OFFICE.

MYRON CASE, OF KASOAG, NEW YORK.

IMPROVEMENT IN HAND CORN-PLANTERS.

Specification forming part of Letters Patent No. 39,548, dated August 18, 1863.

*To all whom it may concern:*

Be it known that I, MYRON CASE, of Kasoag, in the county of Oswego and State of New York, have invented a new and Improved Hand Seed-Planter; and I do hereby declare that the following is a full, clear, and exact description of the same, reference being had to the annexed drawing, making a part of this specification, said drawing being a vertical central section of my invention.

This invention consists in a peculiar arrangement of a seed-slide, seed-box, and furrow or hill opener, as hereinafter fully shown and described, whereby the proper dropping and covering of the seed is insured as the handle is operated, and a very simple, efficient, and cheap implement obtained.

To enable those skilled in the art to fully understand and construct my invention, I will proceed to describe it.

A represents a seed-box, which may be constructed of wood having two parallel sides, $a$ $a$, curved front $b$, which gradually diminishes the capacity of the box from its upper to its lower end, and a straight or vertical back piece, $c$. The top of the box A is provided with a slide or cover, $d$, and to the lower end of the seed-box a metal plate, B, of shovel form, is attached by a pivot or joint rod, $e$. To the lower end of the back $c$ of the seed-box A a metal plate, $f$, is secured, and to the side $a$ of the seed-box a spring, $g$, is attached, which bears against the plate B, and has a tendency to keep its lower end against the lower end of plate $f$, as plainly shown in the drawing. Within the seed-box A a partition, $h$, is placed, said partition extending the whole width of the box and from its top down to a trifle below the upper part of the plate $f$, the joint-rod $e$ passing through the lower part of said partition. The partition $h$ has a vertical slot, $g'$, made in it, and this slot extends nearly the whole height of the partition. Between the partition $h$ and the back $c$ of the seed-box a slide, $i$, is placed, and this slide has a seed-cell, $j$, made in it. The slide $i$ is equal in width to the seed-box A, and to its upper end a handle, C, is attached. In the lower part of the slot $g'$ a piece of rubber or other suitable elastic material, $k$, is placed, said rubber bearing against the slide $i$ and serving as a cut-off, as will be hereinafter explained. To the upper part of the seed-box a bail-shaped rod, $l$, is attached, and a button or guide-loop, $m$, is secured to the handle C, the rod $l$ passing through the button or guide-loop.

The operation of the implement is as follows: The seed-box A is filled with seed, and when the operator draws upward the handle C the cell $j$ fills with seed, and in depressing said handle the seed in $j$ falls into a recess, $n$, in the back $c$. As the slide $i$ is again raised the recess $j$ is refilled, and the seed that previously fell into the recess $n$ will fall between the plates $f$ and B, to be forced into the hole in the ground when the slide is again forced down by the operator. The slide $i$ forces the seed into the ground, the plate B being forced outward as the slide descends. The cut-off $k$ prevents any more than the proper quantity of seed from passing below it. The plates B $f$ are shoved into the soil at the desired spots by the operator in order to make the necessary holes to receive the seed, and the device may be manipulated with the greatest facility and the seed planted with certainty.

In all hand seed-platers that have passed under my observation there has been a difficulty attending the distribution or dropping of the seed. The seed will frequently be distributed in unequal quantities and sometimes not at all, so that many hills will be missed. In many cases, again, the seed will be dropped in too large quantities. By my invention this difficulty is obviated, for as the seed-cell $j$ rises it fills, and all surplus seed will drop into the mass below, and as the slide $i$ descends the seed in $j$ passes into the recess $n$, and below the slide $i$ as it ascends, thereby insuring an equal distribution of the seed.

My implement, constructed as above described, combines the following great advantages: The filling of the seed-aperture at each stroke is rendered certain by forming the said pocket obliquely through the follower and causing it to take seed as it ascends through the corn, instead of by a compressing action in its downward stroke. The planting action is also rendered more certain by extending the seed-aperture $j$ completely through the follower and employing a pocket or cavity, $n$, in the stationary plate at the rear of the follower to receive a charge of seed at each downward stroke of the follower, and there retain it in a position below the level of the reservoir A, ready for delivery directly under the follower when the latter reaches the upward extremity of its stroke, instead of requiring the feed to fall a considerable distance before reaching the lower end of the follower, as is common with many other machines in use.

I do not claim separately the slide $i$, provided with a seed-cell, $j$, nor do I claim any of the parts when separately considered; but,

Having thus described my invention, what I do claim as new, and desire to secure by Letters Patent, is—

The combination of the slide $i$, provided with the inclined seed-aperture $j$, passing entirely through it, the recess $n$, the back piece, $c$, below the seed-reservoir, the plates $f$ B, partition $h$, and gum-elastic cut-off $k$, placed within and attached to the seed-box A, the whole being constructed and arranged as and for the purposes specified.

MYRON CASE.

Witnesses:
J. F. SELDEN,
HERMAN PARKER.